United States Patent [19]  
Ciardelli et al.

[11] Patent Number: 5,071,928  
[45] Date of Patent: Dec. 10, 1991

[54] PROCESS FOR POLYMERIZING ETHYLENE AND COPOLYMERIZING ETHYLENE WITH ALPHA-OLEFINS AND RELEVANT CATALYST

[75] Inventors: Francesco Ciardelli, Pisa; Francesco Masi, San Donato Milanese; Stefano Malquori, Castelfiorentino; Cesare Ferrero, Monza; Lia Barazzoni, Piacenza; Francesco Menconi, Massa Macinaia; Angelo Moalli, Castelletto Ticino; Renzo Invernizzi, Milan, all of Italy

[73] Assignee: Enichem Anic S.p.A., Palermo, Italy

[21] Appl. No.: 407,611

[22] Filed: Sep. 15, 1989

[30] Foreign Application Priority Data

Sep. 29, 1988 [IT] Italy .................... 22115 A/88

[51] Int. Cl.$^5$ .................. C08F 4/651; C08F 4/653; C08F 10/2
[52] U.S. Cl. .................. 526/114; 502/113; 526/348.6
[58] Field of Search ......................... 526/114

[56] References Cited

U.S. PATENT DOCUMENTS 4,130,699 12/1978 Hoff et al. .................... 526/84  
4,154,701 5/1979 Melquist .................... 526/116  
4,368,305 1/1983 Tanaka et al. .................... 526/114  
4,663,404 5/1987 Inbernizzi et al. .................... 526/114

Primary Examiner—Edward J. Smith  
Attorney, Agent, or Firm—Hedman, Gibson, Costigan & Hoare

[57] ABSTRACT

Ethylene homopolymers and ethylene copolymers with alpha-($C_3$–$C_{10}$)-olefins are obtained by polymerizing the monomers with a polymerization catalyst formed by:
a) an alkyl-aluminum; and
b) a modified solid catalyst component obtained by treating with a Lewis' base a non-modified solid component to be defined by means of the following formula, expressed as atomic proportions:

Ti(1), hf(9.5-3), Si (1-6), Mg (0.5-15) Al (0.5-15),

X (20-60, ROH (1-10)
wherein:
X represents either chlorine and bromine, and
R represents either a linear or branched alkyl radical of from 1 to 6 carbon atoms.

The catalyst is particularly useful for controlling the molecular weight and the molecular weight distribution of ethylene hompolymers and copolymers.

10 Claims, 1 Drawing Sheet

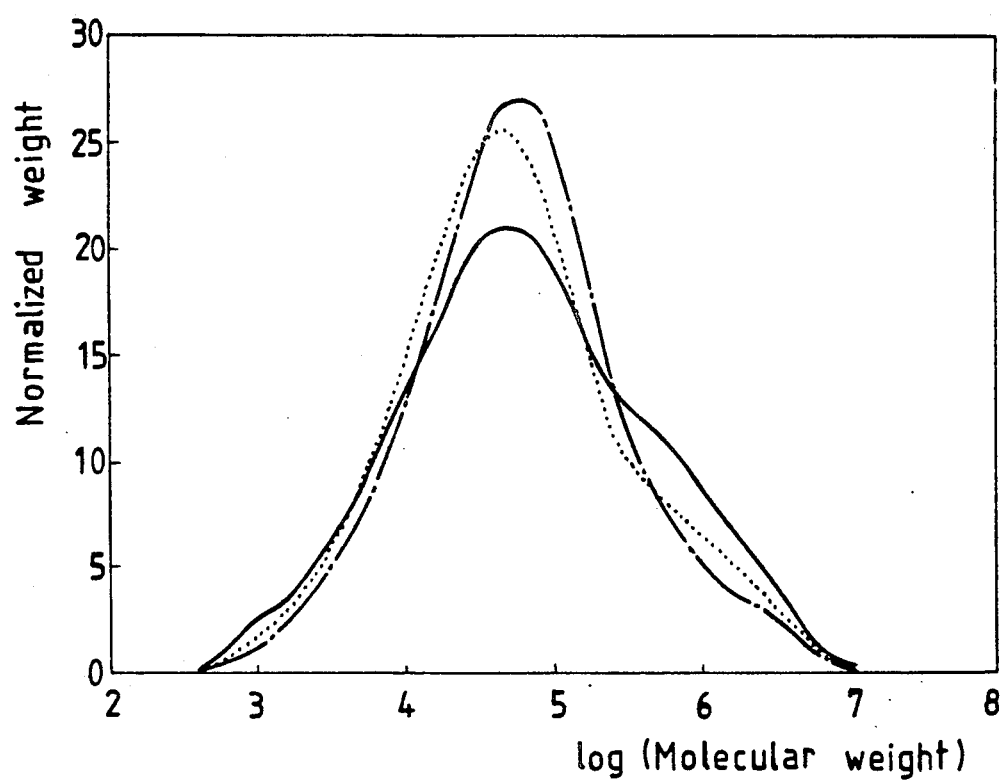

PROCESS FOR POLYMERIZING ETHYLENE AND COPOLYMERIZING ETHYLENE WITH ALPHA-OLEFINS AND RELEVANT CATALYST

The present invention relates to a process and a catalyst for the polymerization of ethylene and the copolymerization of ethylene with alpha-($C_3$-$C_{10}$)-olefins in order to produce ethylene polymers and copolymers with controlled molecular weights, and a controlled molecular weight distribution.

Those skilled in the art know well that ethylene, or, in general, alpha-olefins can be polymerized by means of the Ziegler's low-pressure process. For that purpose, catalysts are generally used which are formed by a compound of elements of from the IVth to the Vth Sub-groups of the periodic system of the elements (compounds of the transition metals), in mixture with an organometallic compound, or a hydride of the elements of from the Ist to the IIIrd Sub-groups of the periodic system by operating in suspension, in solution or in gas phase. Catalysts are also generally known, in which the transition metal is fixed onto a solid support, of either inorganic or organic character, possibly either chemically or physically treated.

The transition metal generally used for the intended purpose is titanium, which makes it possible for high yield and productivity values to be obtained, in particular when ethylene is polymerized. Also combinations of titanium with such other transition metals as vanadium, zirconium and hafnium are used in the preparation of ethylene polymers and copolymers endowed with particular characteristics.

Thus, in U.S. Pat. No. 4,663,404 the polymerization of ethylene and the copolymerization of ethylene with alpha-olefins in the presence of a catalyst formed by a trialkyl-aluminum and a solid catalyst component containing titanium and hafnium is disclosed. In particular, such a solid component is obtained by means of the reaction of an alkyl-aluminum halide with the product derived from the reaction between hafnium tetrahalide, silicon alkoxide, magnesium halide, aliphatic alcohol and titanium a koxide. This catalyst produces ethylene polymers and copolymers with a wide distribution of molecular weights, particularly suitable for the processing of blow—moulding type, by operating in one single polymerization step. By means of this catalyst, the width of the range of distribution of the molecular weights is practically governed by the relative proportions of titanium and hafnium contained in the same catalyst.

The present Applicant has found now that the solid catalyst component according to U.S. Pat. No. 4,663,404 can be treated with a Lewis' base in order to yield a modified solid catalyst component. This modified component makes it possible for the molecular weight—with hydrogen being added as the moderator——and the molecular weight distribution of polyolefins, to be varied in a precise way and within wide ranges in ethylene polymerization and copolymerization processes as a function of the charged amount of Lewis' base. This possibility of regulation is unexpectedly much wider than as deriving from the chemical composition of the catalyst. It hence results it possible ethylene homopolymers and copolymers with a molecular weight distribution from narrow to wide to be obtained in a simple and advantageous way, which are endowed with suitable characteristics for the most different processing needs, from injection moulding to blow-moulding process types.

In accordance therewith, the present invention relates to a process for producing ethylene homopolymers and ethylene copolymers with an alpha-($C_3$—$C_{10}$)-olefin, with controlled values of the molecular weight and of molecular weight distriıoution, characterized in that a polymerization catalyst is used, which is formed by:
  a) an alkyl-aluminum; and
  b) a modified solid catalyst component obtained by treating with a Lewis' base a non-modified solid component to be defined by means of the following formula (I), expressed as atomic proportions:

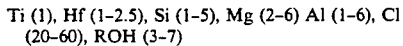

Ti (1), Hf (1-2.5), Si (1-5), Mg (2-6) Al (1-6), Cl (20-60), ROH (3-7)

wherein:
X represents either chlorine and bromine, and
R represents either a linear or branched alkyl radical of from 1 to 6 carbon atoms, with said treatment being carried out at room temperature, or at temperature values higher than room temperature, with the molar ratio of the Lewis' base to titanium in said solid component being comprised within the range of from 0.1/1 to 20/1.

BRIEF DESCRIPTION OF THE DRAWINGS

FIG. 1 shows, in graphic form, the molecular weight distribution of ethylene-butene-1 copolymers prepared in accordance with the process of the present invention.

The non-modified solid component (I) can be obtained from an alkyl-aluminum halide and the product from the reaction between hafnium halide, silicon alkoxide, magnesium halide, aliphatic alcohol and titanium alkoxide, by means of any of the methodologies as disclosed in U.S. Pat. No. 4,663,404, the disclosure of which is herein incorporated by reference.

A preferred process for preparing the non-modified solid component (I) is the following. To a reactor hafnium halide (preferably hafnium tetrachloride), silicon alkoxide (preferably silicon tetraethoxide), magnesium halide (preferably magnesium chloride), aliphatic alcohol (preferably ethanol), titanium alkoxide (preferably titanium tetra-ethoxide) and an inert hydrocarbon diluent are charged. The whole mass is heated up to 100°-150° C. and is maintained at this temperature for 1-3 hours, with a suspension being obtained. To this suspension the alkyl-aluminum halide (preferably an alkyl-aluminum sesquichloride) is gradually added during a time of 1-3 hours. Under these conditions, the non-modified, solid component (I) precipitates.

A preferred non-modified, solid component (I) for the purposes according to the present invention can be defined by means of the following formula, still expressed as atomic proportions:

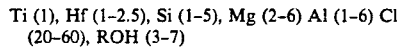

Ti (1), Hf (1-2.5), Si (1-5), Mg (2-6) Al (1-6) Cl (20-60), ROH (3-7)

wherein R has the meaning specified hereinabove.

The Lewis' bases suitable for modifying the solid catalyst component can belong to several compound classes and, in particular:
alkyl esters of mono-carboxy or poly-carboxy aromatic acids containing from 1 to 10 carbon atoms in their alkyl portion, such as, e.g., ethyl benzoate and n-butyl phthalate;

dialkyl, diaryl or alkyl-aryl ethers containing from 1 to 10 carbon atoms in their alkyl portion, and cyclic ethers, such as, e.g., di-amyl ether and tetrahydrofuran;

primary, secondary and tertiary aliphatic and aromatic amines and cyclic amines, e.g., tri-ethyl-amine and 2,2,6,6-tetramethyl-piperidine;

alkyl phosphites and alkyl phosphates, such as, e.g., tributyl-phosphate;

disiloxanes and alkoxy-silanes, such as, e.g., hexamethyl-disiloxane and phenyl-triethoxy-silane.

The modification of the solid component (I) is carried out by suspending such a component in an inert organic diluent, preferably in an aliphatic hydrocarbon, and adding the Lewis' base to such a suspension in the previously specified ratios. The suspension is kept with stirring at a temperature comprised within the range of from 20° to 90° C., for a time comprised within the range of from 0.5 to 4 hours. The process is preferably carried out at a temperature of about 30° C., for a time of about 1 hour. The modified solid component [the (b) component] of the catalyst according to the present invention is thus obtained and can be separated from the the suspension and submitted to washing with a hydrocarbon solvent, such as a paraffinic solvent. However, in the preferred form of practical embodiment, the suspension is directly used in the polymerization process.

The (a) component of the catalyst of the present invention is a trialkyl-aluminum, or a chloride of alkyl-aluminum containing from 1 to 10 carbon atoms in either its linear or branched alkyl portion.

Triisobutyl-aluminum, triethyl-aluminum and diethyl-aluminum mono-chloride are preferably used for the intended purpose.

Furthermore, in the catalyst according to the present invention atomic ratios of aluminum, in (a) component, to titanium, in (b) component, are maintained, which are comprised within the range of from 3 to 150.

The catalyst according to the present invention is active in the polymerization of ethylene and in the co-polymerization of ethylene with alpha-($C_3$–$C_{10}$)-olefins. Examples of such alpha-olefins are propylene, butene-1 and hexene-1. The polymerization is advantageously carried out in suspension in a hydrocarbon liquid vehicle such as hexane, cyclohexane and heptane, at temperatures comprised within the range of from 60° to 100° C., under a partial pressure of ethylene comprised within the range of from 1 to 25 abs.atm, and in the presence of hydrogen as a moderator.

By operating under these conditions, ethylene homopolymers and copolymers can be obtained with controlled values of molecular weight and a controlled molecular weight distribution as a function of the amount of the Lewis' base used in the modification of the solid catalyst component and of the amount of hydrogen used in the polymerization, and this for each value of the atomic ratio of hafnium to titanium in said solid component.

In this regard, reference is made to FIG. 1 of the hereto attached drawing table, in which the course is reported of the distribution of molecular weights of ethylene-butene-1 copolymers obtained from three tests carried out under comparable conditions. More in particular, the solid line of FIG. 1 shows the distribution of molecular weights of ethylene-butene-1 copolymer obtained from the experimental Example 4, with the non-modified solid catalyst component of Example 2, having an Hf/Ti atomic ratio of 2.3. The dotted line shows the distribution of molecular weights of ethylene-butene-1 copolymer obtained from the experimental Example 24, with the solid catalyst component of Example 15, having an Hf/Ti atomic ratio of 2.3, modified with ethyl benzoate with a molar ratio of ethyl benzoate to titanium of 2:1. The chain line shows the distribution of molecular weights of ethylene-butene-1 copolymer obtained from the experimental Example 26, with the solid catalyst component of Example 17, having an Hf/Ti atomic ratio of 2.3, modified with ethyl benzoate with a molar ratio of ethyl benzoate to titanium of 4:1.

From these lines one can observe the progressive change which take place in the molecular weight and in the molecular weight distribution of ethylene-butene-1 copolymer, and the progressive disappearance of the bimodal trend with increasing concentrations of Lewis' base used in the modification of the solid component of the catalyst.

Furthermore, by observing the experimental Examples from 10 to 13, in combination with the Examples from 5 to 8, one can observe that when a solid catalyst component is used in which the atomic ratio of Hf/Ti is 1, not modified and modified with increasing amounts of ethyl benzoate up to a molar ratio of ethyl benzoate to titanium of 20:1, copolymers of ethylene and butene-1 are obtained, by operating under comparable conditions, the values of melt flow index of which are comprised within the range of from 0.5 g/10 minutes up to about 13 g/10 minutes, and with shear sensitivity values correspondingly comprised within the range of from 73 to 28.

It results hence evident that by operating according to the present invention, it is possible to produce ethylene polymers or copolymers having desired characteristics as a function of the planned application. In particular, it results is possible polymers having a narrow distribution of molecular weight, suitable for injection-moulding and monofilaments production; polymers with an intermediate molecular weight distribution, suitable for use in products for raffia; as well as polymers with a wide molecular weight distribution suitable for processing by means of blow-moulding methods for the production of bottles and of films to be obtained.

The following experimental Examples are reported in order to better illustrate the present invention.

Example 1 (Comparative Example)

40 g (0.125 mol) of hafnium tetrachloride and 60 ml (0.268 mol) of silicon tetraethoxide are charged under a nitrogen atmosphere to a flask equipped with a dripping funnel, a thermometer, a stirrer and a reflux condenser. The mixture is left for 20 minutes under contact conditions with slow stirring at room temperature (20°–25° C.).

To the same flask 60 g (0,625 mol) of magnesium chloride, 64 ml (1.11 mol) of ethanol, 42.5 ml (0.125 mol) of titanium tetrabutoxide and 300 ml of liquid C10–C13 LIMESOL paraffinic blend, previously thoroughly dried, are charged. The addition is carried out at room temperature, and the temperature is subsequently increased up to 140° C. and is maintained for 2 hours under such conditions, under nitrogen and with the mass being kept with slow stirring.

An emulsion is thus obtained, which is cooled down to 80° C., and to it 850 ml (3.75 mol) of ethyl-aluminum sesquichloride is slowly added during a 2-hours time. During the addition a solid precipitate is formed. After cooling down to room temperature, the suspended solid is submitted to chemical analysis and the following composition is determined (values as percent by weight):

Mg 8.7%, Cl 59.6%, Ti 3.3%, Hf 12.3%, EtOH 7.7%, BuOH 3.0%, Al 2.2%, Si 3.2%.

When its composition is expressed by means of atomic proportions, the solid catalyst component can be defined by means formla:

Mg (5.2), Ti (1), Hf (1), Si (1.6), Al (1.2), Cl (24.3), (OEt+OBu) (3.1).

The average granulometry of the solid product is of 4–6 microns, and its shape is irregular.

Example 2 (Comparative Example)

40 g (0.125 mol) of hafnium tetrachloride and 60 ml (0.268 mol) of silicon tetraethoxide are charged under a nitrogen atmosphere to a glass flask equipped with a dripping funnel, a thermometer, a stirrer and a reflux condenser. The mixture is left for 20 minutes under contact conditions with slow stirring at room temperature (20°–25° C.).

To the same flask 23.8 g (0.25 mol) of magnesium chloride, 26 ml (0.45 mol) of ethanol, 16.9 ml (0.050 mol) of titanium tetrabutoxide and 300 ml of liquid C10–C13LIMESOL paraffinic blend, previously thoroughly dried, are charged. The addition is carried out at room temperature, and the temperature is subsequently increased up to 140° C. and is maintained for 2 hours under such conditions, under nitrogen and with the mass being kept with slow stirring.

An emulsion is thus obtained, which is cooled down to 80° C., then 340 ml (1.5 mol) of ethyl-aluminum sesquichloride is slowly added during a 2-hours time. During the addition a solid precipitate is formed. After cooling down to room temperature, the solid is submitted to chemical analysis and the following composition is determined (values as percent by weight):

Mg 4.0%, Cl 59.7%, Ti 1.6%, Hf 13.8%, EtOH 9.4% BuOH 2.2%, Al 4.9%, Si 4.4%.

When its composition is expressed by means of atomic proportions, the solid catalyst component can be defined by means of the formula:

Mg (4.9), Ti (1), Hf (2.3), Si (4.7) Al (5.4), Cl (50.1), (OEt+OBu) (6.9).

The granulometry of the solid product is similar to that of Example 1.

Example 3 (Comparative Example)

To a stirred reactor of 5.0 litres 1,900 ml of anhydrous n-hexane, 0.8 g of tri-isobutyl-aluminum and 48 mg of the solid catalyst component of Example 1 are charged in the same order as said.

The temperature of the reactor is increased up to 85° C. and the pressure inside the reactor is increased up to 5.3 abs.atm with hydrogen. 3.0 g of butene-1 is fed by pushing with ethylene, then ethylene is fed until a total pressure of 11 abs.atm is reached, with a ratio of hydrogen to ethylene of 1.06 by volume being thus obtained. The pressure is maintained constant over the following 4 hours by means of a continuous ethylene feed. At the end of this time period, the polymerization is discontinued by charging to the reactor 20 ml of an alcoholic solution at 10% by weight of ionol (2,6-ditert.-butyl-p-cresol).

An ethylene-butene-1 copolymer is obtained with the following values of:

productivity : 11.5 kg, expressed as polymer kg per each gram of solid catalyst component;

yield : 348 kg, expressed as polymer kg per each gram of titanium in the solid catalyst component.

The so-obtained copolymer has the following characteristics:

inherent viscosity : $[\eta] = 1.96$ dl/g, as measured in 1,2,3-trichlorophenol at 135° C., melt flow index : 0.45 g/10 minutes (as measured under a load of 2.16 kg) according to ASTM-D 1238, shear sensitivity : 73 (21.6 kg/2.16 kg) according to ASTM-D 1238, density : 0.9559 g/ml, according to ASTM-D 2839.

The molecular weight distribution is determined by means of a GPC WATERS instrument Type 150-C ALC/6PC with a set of columns of ULTRA STYRA GEL Type of 500, $10^3$, $10^4$, $10^5$, $10^6$ Å of diameter, after dissolving the sample in 1,2,3-trichlorobenzene. The following values were obtained:

$M_w$ (weight average molecular weight): 243,000;
$M_n$ (number average molecular weight): 14,900;
$M_z$ (maximum molecular weight): 2,251,000;
$M_w/M_n$ : 16.3

Example 4 (Comparative Example)

The process is carried out in the same way as disclosed in Example 1, with the exception that 155.4 mg of the solid catalyst component of Example 2 is charged, the pressure is then increased with hydrogen up to 6.7 abs.atm, then 3.0 g of butene-1 is fed and the pressure is increased up to 11 abs.atm with ethylene (ratio of hydrogen to ethylene of 1.86 by volume). The polymerization is allowed to proceed for 4 hours, and an ethylene-butene-1 copolymer is obtained with:

productivity : 2.1 kg;
yield : 133.0 kg.

The so-obtained copolymer displays the following characteristics:

inherent viscosity : 2.6 dl/g;
melt flow index : 0.08 g/10 minutes;
shear sensitivity : 170;
density : 0.9555 g/ml;
$M_w$ : 350,000;
$M_n$ : 11,200;
$M_z$ : 2,507,000;
$M_w/M_n$ : 31.2.

Example 5

To a large glass test tube of capacity, equipped with a side stopcock and a magnetic stirrer 592 mg of the solid catalyst component of Example 1, equivalent to 0.407 mmol of titanium, is charged at the temperature of 30° C. under a blanketing atmosphere of anhydrous nitrogen. Then, 18 ml of anhydrous n-heptane and 61.05 mg (0.407 mmol) of ethyl benzoate (molar ratio of ethyl benzoate to titanium 1:1) are charged.

The suspension is maintained at 30° C., with stirring, for 60 minutes. The modified solid catalyst component is thus obtained, which is directly used in the polymerization.

Example 6

To the same test tube as of Example 5, 800 mg of the solid catalyst component of Example 1 (0.55 mmol of titanium), 28 ml of anhydrous n-heptane and 412.5 mg (2.75 mmol) of ethyl benzoate (molar ratio of ethyl benzoate to titanium 5:1) are charged at 30° C.

The reaction mass is maintained for 60 minutes at 30° C., with stirring, and a suspension of the modified solid catalyst component is obtained, which is directly used in the polymerization.

Example 7

To the same test tube as of Example 5, 680 mg of the solid catalyst component of Example 1 (0.47 mmol of titanium), 18 ml of anhydrous n-heptane and 701.2 mg (4.67 mmol) of ethyl benzoate (molar ratio of ethyl benzoate to titanium 10:1) are charged at 30° C.

The reaction mass is maintained for 60 minutes at 30° C., with stirring, and a suspension of the modified solid catalyst component is obtained, which is directly used in the polymerization.

Example 8

To the same test tube as of Example 5, 720 mg of the solid catalyst component of Example 1 (0.495 mmol of titanium), 18 ml of anhydrous n-heptane and 1.485 g (9.9 mmol) of ethyl benzoate (molar ratio of ethyl benzoate to titanium 20:1) are charged at 30° C.

The reaction mass is maintained for 60 minutes at 30° C., with stirring, and a suspension of the modified solid catalyst component is obtained, which is directly used in the polymerization.

Example 9

To the same test tube as of Example 5, 800 mg of the solid catalyst component of Example 1 (0.55 mmol of titanium), 18 ml of anhydrous n-heptane and 435.3 mg (2.75 mmol) of di-amyl ether (molar ratio of di-amyl ether to titanium 5:1) are charged at 30° C.

The reaction mass is maintained for 60 minutes at 30° C., with stirring, and a suspension of the modified solid catalyst component is obtained, which is directly used in the polymerization.

Example 10

To a stirred reactor of 5.0 litres of capacity, 1,900 ml of anhydrous n-hexane, 0.8 g of tri-isobutyl-aluminum and 59.2 mg of the modified solid catalyst component of Example 5 are charged in the same order as said.

The temperature of the reactor is increased up to 85° C. and the pressure inside the reactor is increased up to 5.8 abs.atm with hydrogen. 3.0 g of butene-1 is fed by pushing with ethylene, then ethylene is fed until a total pressure of 11 abs.atm is reached, with a ratio of hydrogen to ethylene of 1.29 by volume being thus obtained. The pressure is maintained constant over the following 4 hours by means of a continuous ethylene feed. At the end of this time period, the polymerization is discontinued by charging to the reactor 20 ml of an alcoholic solution at 10% by weight of ionol.

An ethylene-butene-1 copolymer is obtained, with the following values of:
productivity : 7.01 kg;
yield : 210 kg.

The so-obtained copolymer has the following characteristics:
inherent viscosity : 1.76 dl/g;
melt flow index : 0.84 g/10 minutes;
shear sensitivity : 59
density : 0.9551 g/ml.

Example 11

The process is carried out in the same way as disclosed in Example 10, using anhydrous n-heptane as the solvent, and charging to the reactor 0.8 g of tri-isobutyl aluminum and 60 mg of the modified solid catalyst component of Example 6.

With all of the other reaction conditions being the same as of Example 10, an ethylene-butene-1 copolymer is obtained with:
productivity : 6.91 kg;
yield : 209 kg.

The so-obtained copolymer displays the following characteristics:
inherent viscosity : 1.47 dl/g;
melt flow index : 2.35 g/10 minutes;
shear sensitivity : 44;
density : 0.9575 g/ml.

Example 12

The process is carried out in the same way as disclosed in Example 10, using anhydrous n-hexane as the solvent, and charging to the reactor 0.8 g of tri-isobutyl aluminum and 67.9 mg of the modified solid catalyst component of Example 7.

With all of the other reaction conditions being the same as of Example 10, an ethylene-butene-1 copolymer is obtained with:
productivity : 5.5 kg;
yield : 167 kg.

The so-obtained copolymer displays the following characteristics:
inherent viscosity : 1.25 dl/g;
melt flow index : 5.31 g/10 minutes;
shear sensitivity : 34;
density : 0.9610 g/ml.

Example 13

The process is carried out in the same way as disclosed in Example 10, using anhydrous n-hexane as the solvent, and charging to the reactor 0.8 g of tri-isobutyl aluminum and 60 mg of the modified solid catalyst component of Example 8.

With all of the other reaction conditions being the same as of Example 10, an ethylene-butene-1 copolymer is obtained with:
productivity : 3.7 kg;
yield : 111 kg.

The so-obtained copolymer displays the following characteristics:
inherent viscosity : 1.0 dl/g;
melt flow index : 12.9 g/10 minutes;
shear sensitivity : 28;
density : 0.9617 g/ml.

Example 14

The process is carried out in the same way as disclosed in Example 10, using anhydrous n-hexane as the solvent, and charging to the reactor 0.8 g of tri-isobutyl aluminum and 66.3 mg of the modified solid catalyst component of Example 9.

With all of the other reaction conditions being the same as of Example 10, an ethylene-butene-1 copolymer is obtained with:
productivity : 9.57 kg;

yield : 290 kg.

The so-obtained copolymer displays the following characteristics:
inherent viscosity : 1.3 dl/g;
melt flow index : 3.9 g/10 minutes;
shear sensitivity : 42;
density : 0.9578 g/ml.

Example 15

To a large glass test tube of 50 ml of capacity equipped with a side stopcock and a magnetic stirrer 900 mg of the solid catalyst component of Example 2 (0.30 mmol of titanium), is charged at the temperature of 30° C. under a blanketing atmosphere of anhydrous nitrogen. Then, 18 ml of anhydrous n-heptane and 90 mg (0.6 mmol) of ethyl benzoate (molar ratio of ethyl benzoate to titanium 2:1) are charged.

The suspension is maintained at 30° C., with stirring, for 60 minutes, and a suspension of the modified solid catalyst component is obtained, which is directly used in the polymerization.

Example 16

The process is carried out in the same test tube as of Example 15, at 30° C., by charging 980 mg of the solid catalyst component of Example 2 (0.33 mmol of titanium), 18 ml of anhydrous n-heptane and 148.5 mg (0.99 mmol) of ethyl benzoate (molar ratio of ethyl benzoate to titanium 3:1).

After 60 minutes of stirring at 30° C., a suspension of the modified solid catalyst component is obtained, which is directly used in the polymerization.

Example 17

The process is carried out in the same test tube as of Example 15, at 30° C., by charging 820 mg of the solid catalyst component of Example 2 (0.27 mmol of titanium), 18 ml of anhydrous n-heptane and 164 mg (1.1 mmol) of ethyl benzoate (molar ratio of ethyl benzoate to titanium 4:1).

After 60 minutes of stirring at 30° C., a suspension of the modified solid catalyst component is obtained, which is directly used in the polymerization.

Example 18

The process is carried out in the same test tube as of Example 15, at 30° C., by charging 874 mg of the solid catalyst component of Example 2 (0.29 mmol of titanium), 18 ml of anhydrous n-heptane and 218.5 mg (1.46 mmol) of ethyl benzoate (molar ratio of ethyl benzoate to titanium 5:1).

After 60 minutes of stirring at 30° C., a suspension of the modified solid catalyst component is obtained, which is directly used in the polymerization.

Example 19

The process is carried out in the same test tube as of Example 15, at 30° C., by charging 984 mg of the solid catalyst component of Example 2 (0.33 mmol of titanium), 18 ml of anhydrous n-heptane and 261.2 mg (1.65 mmol) of di-n-amyl ether (molar ratio of di-n-amyl ether to titanium 5:1).

After 60 minutes of stirring at 30° C., a suspension of the modified solid catalyst component is obtained, which is directly used in the polymerization.

Example 20

The process is carried out in the same test tube as of Example 15, at 30° C., by charging 1,052 mg of the solid catalyst component of Example 2 (0.35 mmol of titanium), 18 ml of anhydrous n-heptane and 488 mg (1.75 mmol) of di-n.butyl phthalate (molar ratio of di-n-butyl phthalate to titanium 5:1).

After 60 minutes of stirring at 30° C., a suspension of the modified solid catalyst component is obtained, which is directly used in the polymerization.

Example 21

The process is carried out in the same test tube as of Example 15, at 30° C., by charging 784 mg of the solid catalyst component of Example 2 (0.26 mmol of titanium), 18 ml of anhydrous n-heptane and 208.8 mg (0.78 mmol) of tri-n-butyl phosphate (molar ratio of tri-n-butyl phosphate to titanium 3:1).

After 60 minutes of stirring at 30° C., a suspension of the modified solid catalyst component is obtained, which is directly used in the polymerization.

Example 22

The process is carried out in the same test tube as of Example 15, at 30° C., by charging 836 mg of the solid catalyst component of Example 2 (0.28 mmol of titanium), 18 ml of anhydrous n-heptane and 79.1 mg (0.56 mmol) of 2,2,6,6-tetramethyl-piperidine (molar ratio of 2,2,6,6-tetramethyl-piperidine to titanium 2:1).

After 60 minutes of stirring at 30° C., a suspension of the modified solid catalyst component is obtained, which is directly used in the polymerization.

Example 23

The process is carried out in the same test tube as of Example 15, at 30° C., by charging 794 mg of the solid catalyst component of Example 2 (26.5 mmol of titanium), 18 ml of anhydrous n-heptane and 85.8 mg (0.53 mmol) of hexamethyl-dioxane (molar ratio of hexamethyl-dioxane to titanium 2:1).

After 60 minutes of stirring at 30° C., a suspension of the modified solid catalyst component is obtained, which is directly used in the polymerization.

Example 24

To a stirred reactor of 5.0 litres of capacity, 1,900 ml of anhydrous n-hexane, 1.2 g of tri-isobutyl-aluminum and 129 mg of the modified solid catalyst component of Example 15 are charged in the same order as said.

The temperature of the reactor is increased up to 85° C. and the pressure inside the reactor is increased up to 6.5 abs.atm with hydrogen. 3.0 g of butene-1 is fed by pushing with ethylene, then ethylene is fed until a total pressure of 11 abs.atm is reached (ratio of hydrogen to ethylene of 1.71 by volume). The pressure is maintained constant over the following 4 hours by means of a continuous ethylene feed. At the end of this time period, the polymerization is discontinued by charging to the reactor 20 ml of an alcoholic solution at 10% by weight of ionol.

An ethylene-butene-1 copolymer is obtained with the following values:
productivity : 1.8 kg;
yield : 114 kg.

The so-obtained copolymer has the following characteristics:
inherent viscosity : 2.2 dl/g;

melt flow index : 0.30 g/10 minutes;
shear sensitivity : 138
density : 0.9585 g/ml.
$M_w$ : 267,000;
$M_n$ : 14,300;
$M_z$ : 2,240,000;
$M_w/M_n$ : 18.7

Example 25

The process is carried out under the same conditions as of Example 24, with the exception that 125.1 mg of the modified solid catalyst component of Example 16 is used, with the pressure inside the reactor being increased up to 5.9 abs.atm with hydrogen, and then up to 11 abs.atm with ethylene (ratio of hydrogen to ethylene of 1.34 by volume).

An ethylene-butene-1 copolymer is obtained with the following values:
productivity : 2.72 kg;
yield : 170 kg.

The so-obtained copolymer has the following characteristics:
inherent viscosity : 2.3 dl/g;
melt flow index : 0.27 g/10 minutes;
shear sensitivity : 113
density : 0.9560 g/ml.
$M_w$ : 272,000;
$M_n$ : 12,600;
$M_z$ : 2,604,000;
$M_w/M_n$ : 21.6

Example 26

The process is carried out under the same conditions as of Example 24, with the exception that 108 mg of the modified solid catalyst component of Example 17 is used, with the pressure inside the reactor being increased up to 4.7 abs.atm with hydrogen, and then up to 11 abs.atm with ethylene (ratio of hydrogen to ethylene of 0.84 by volume).

An ethylene-butene-1 copolymer is obtained with the following values:
productivity : 4.2 kg;
yield : 263 kg.

The so-obtained copolymer has the following characteristics:
inherent viscosity : 2.3 dl/g;
melt flow index : 0.31 g/10 minutes;
shear sensitivity : 73
density : 0.9544 g/ml.
$M_w$ : 250,000;
$M_n$ : 14,800;
$M_z$ : 2,330,000;
$M_w/M_n$ : 16.9

Example 27

The process is carried out under the same conditions as of Example 24, with the exception that 129 mg of the modified solid catalyst component of Example 18 is used, with the pressure inside the reactor being increased up to 5.4 abs.atm with hydrogen, and then up to 11 abs.atm with ethylene (ratio of hydrogen to ethylene of 1.1 by volume).

An ethylene-butene-1 copolymer is obtained with the following values:
productivity : 2.3 kg;
yield : 146 kg.

The so-obtained copolymer has the following characteristics:
inherent viscosity : 1.66 dl/g;
melt flow index : 1.33 g/10 minutes;
shear sensitivity : 65
density : 0.9588 g/ml.
$M_w$ : 130,000;
$M_n$ : 12,700;
$M_z$ : 2,170,000;
$M_w/M_n$ : 10.2

Example 28

The process is carried out under the same conditions as of Example 24, with the exception that 62 mg of the modified solid catalyst component of Example 19 is used, with the pressure inside the reactor being increased up to 4.5 abs.atm with hydrogen, and then up to 11 abs.atm with ethylene (ratio of hydrogen to ethylene of 0.79 by volume).

An ethylene-butene-1 copolymer is obtained with the following values:
productivity : 5.9 kg;
yield : 370 kg.

The so-obtained copolymer has the following characteristics:
inherent viscosity : 2.45 dl/g;
melt flow index : 0.22 g/10 minutes;
shear sensitivity : 89
density : 0.9515 g/ml.
$M_w$ : 263,000;
$M_n$ : 13,700;
$M_z$ : 3,516,000;
$M_w/M_n$ : 19.3

Example 29

The process is carried out under the same conditions as of Example 24, with the exception that 126 mg of the modified solid catalyst component of Example 20 is used, with the pressure inside the reactor being increased up to 6.5 abs.atm with hydrogen, and then up to 11 abs.atm with ethylene (ratio of hydrogen to ethylene of 1.75 by volume).

An ethylene-butene-1 copolymer is obtained with the following values:
productivity : 1.3 kg;
yield : 82.7 kg.

The so-obtained copolymer has the following characteristics:
inherent viscosity : 1.86 dl/g;
melt flow index : 0.62 g/10 minutes;
shear sensitivity : 103
density : 0.9593 g/ml.

Example 30

The process is carried out under the same conditions as of Example 24, with the exception that 153 mg of the modified solid catalyst component of Example 21 is used, with the pressure inside the reactor being increased up to 6.5 abs.atm with hydrogen, and then up to 11 abs.atm with ethylene (ratio of hydrogen to ethylene of 1.75 by volume).

An ethylene-butene-1 copolymer is obtained with the following values:
productivity : 2.0 kg;
yield : 127 kg.

The so-obtained copolymer has the following characteristics:
inherent viscosity : 1.8 dl/g;
melt flow index : 0.74 g/10 minutes;
shear sensitivity : 122 density : 0.9588 g/ml.

Example 31

The process is carried out under the same conditions as of Example 24, with the exception that 171 mg of the modified solid catalyst component of Example 22 is used, with the pressure inside the reactor being increased up to 6.7 abs.atm with hydroven, and then up to 11 abs.atm with ethylene (ratio of hydrogen to ethylene of 1.86 by volume).

An ethylene-butene-1 copolymer is obtained with the following values:
productivity : 1.34 kg;
yield : 84.0 kg.

The so-obtained copolymer has the following characteristics:
inherent viscosity : 1.5 dl/g;
melt flow index : 3.8 g/10 minutes;
shear sensitivity : 60
density : 0.9584 g/ml.

Example 32

The process is carried out under the same conditions as of Example 24, with the exception that 150 mg of the modified solid catalyst component of Example 23 is used, with the pressure inside the reactor being increased up to 6.7 abs.atm with hydroven, and then up to 11 abs.atm with ethylene (ratio of nydrogen to ethylene of 1.86 by volume).

An ethylene-butene-1 copolymer is obtained with the following values:
productivity : 2.46 kg;
yield : 154 kg.

The so-obtained copolymer has the following characteristics:
inherent viscosity : 3.0 dl/g;
melt flow index : 0.048 g/10 minutes;
shear sensitivity : 154
density : 0.9482 g/ml.

We claim:

1. A process for producing ethylene homopolymers and ethylene alpha-($C_3$-$C_{10}$)-olefin copolymers with controlled molecular weight distribution, comprising employing a polymerization catalyst comprising
   a) an alkyl aluminum; and
   b) a modified solid catalyst component obtained by modifying a solid component defined by the following formula (I), expressed as atomic proportions:

$$Ti(1), Hf(0.5-3), Si(1-6), Mg(0.5-15), Al(0.5-15), X(b\ 20-60), ROH(1-10) \quad (I)$$

wherein:
   X represents either chlorine or bromine, and
   R represents either a linear or branched alkyl radial of from 1 to 6 carbon atoms, with a Lewis' base selected from the group consisting of:
   alkyl esters of mono-carboxy or poly-carboxy aromatic acids containing from 1 to 10 carbon atoms in their alkyl portion;
   dialkyl, diaryl or alkyl-aryl ethers containing from 1 to 10 carbon atoms in their alkyl portion, and cyclic ethers;
   primary, secondary and tertiary aliphatic and aromatic amines and cyclic amines;
   alkyl phosphites and alkyl phosphates; and disiloxanes and alkoxyl-silanes;
   wherein said modifying is carried out at room temperature or above, and a molar ratio of said Lewis' base to the titanium in said solid component ranging from 0.1/1 to 20/1.

2. A process according to claim 1, wherein said solid component of the catalyst is defined by the following formula (II), expressed as atomic proportions:

$$Ti(1), Hf(1-2.5), Si(1-5), Mg(2-6)\ Al(1-6),\ Cl(20-60), ROH(3-7) \quad (II)$$

wherein R is as defined in claim 1.

3. A process according to claim 1, wherein said said Lewis' base is selected from the group consisting of ethyl benzoate, n-butyl phthalate, di-amyl ether, tetrahydrofuran, tri-ethyl-amine, 2,2,6,6-tetramethyl-piperidine, tributyl-phosphate, hexamethyl-disiloxane and phenyl-triethoxy-silane.

4. A process according to claim 1 wherein said modifying of said solid component with the Lewis' base is carried out with said solid component being suspended in an inert organic diluent, at a temperatue of from 20° to 90° C., for a time of from 0.5 to 4 hours.

5. A process according to claim 4, wherein the modifying is carried out at a temperature of about 30° C., for a time of about 1 hour.

6. A process according to claim 1, wherein said component (a) of the catalyst is selected from the group consisting of trialkyl-aluminum compounds and alkyl-aluminum chlorides containing from 1 to 10 carbon atoms in either its linear or branched alkyl portion.

7. A process according to claim 6, wherein said component (a) is selected from the group consisting of triisobutyl-aluminum, triethyl aluminum and diethyl-aluminum monochloride.

8. A process according to claim 1, wherein the atomic ratio of aluminum in said component (a) to titanium in said component (b) is maintained within the range of from 3 to 150.

9. A process according to claim 1, wherein said polymerization is carried out in suspension in a hydrocarbon liquid vehicle, at temperatures of from 60° to 90° C., under a partial presure of ethylene of from 1 to 25 abs. atm., and in the presence of hydrogen as a moderator.

10. A process according to claim 1, wherein ethylene and butene-1 are copolymerized.

* * * * *